US006840520B2

(12) United States Patent
Faas et al.

(10) Patent No.: US 6,840,520 B2
(45) Date of Patent: Jan. 11, 2005

(54) VALVE PLUG SEAL ASSEMBLY

(75) Inventors: Wayne R. Faas, Marshalltown, IA (US); Ted D. Grabau, Marshalltown, IA (US); Kimball R. Barron, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 10/349,827

(22) Filed: Jan. 23, 2003

(65) Prior Publication Data

US 2004/0145120 A1 Jul. 29, 2004

(51) Int. Cl.[7] .............................................. F16J 15/18
(52) U.S. Cl. ....................... 277/511; 277/534; 277/584
(58) Field of Search ................................ 277/568, 584, 277/534, 511

(56) References Cited

U.S. PATENT DOCUMENTS

| | | | | |
|---|---|---|---|---|
| 2,349,170 A | * | 5/1944 | Jackman | 277/488 |
| 2,739,855 A | * | 3/1956 | Bruning | 277/584 |
| 3,339,932 A | * | 9/1967 | Maha | 277/552 |
| 3,648,718 A | * | 3/1972 | Curran | 137/269 |
| 3,866,924 A | | 2/1975 | French | |
| 4,355,784 A | | 10/1982 | Cain | |
| 4,363,465 A | | 12/1982 | Morrill | |
| 4,440,404 A | * | 4/1984 | Roach et al. | 277/530 |
| 4,489,916 A | * | 12/1984 | Stevens | 251/214 |
| 4,583,722 A | * | 4/1986 | Wallis | 267/119 |
| 4,712,769 A | | 12/1987 | Johnson | |
| 4,834,338 A | | 5/1989 | Davis | |
| 4,898,393 A | * | 2/1990 | Rollins | 277/500 |
| 4,907,650 A | * | 3/1990 | Heinonen | 166/80.1 |
| 4,971,099 A | * | 11/1990 | Cyvas | 137/270 |
| 5,131,666 A | * | 7/1992 | Hutchens | 277/523 |
| 5,209,495 A | * | 5/1993 | Palmour | 277/500 |
| 5,236,014 A | | 8/1993 | Buls et al. | |
| 5,328,177 A | * | 7/1994 | Lair et al. | 277/311 |
| 5,771,931 A | * | 6/1998 | Watson | 137/625.66 |
| 5,799,953 A | * | 9/1998 | Henderson | 277/554 |
| 5,996,472 A | * | 12/1999 | Nguyen et al. | 92/245 |
| 6,116,610 A | * | 9/2000 | Goldswain et al. | 277/395 |
| 6,302,405 B1 | * | 10/2001 | Edwards | 277/584 |
| 6,536,472 B2 | | 3/2003 | Baumann | |
| 6,547,250 B1 | * | 4/2003 | Noble et al. | 277/309 |
| 6,637,452 B1 | * | 10/2003 | Alman | 137/244 |

OTHER PUBLICATIONS

"Energized Seal Resists Aggressive Media," Charles J. Murray, Design Applications, Design News, Mar. 2, 1998, p. 160.
Copy of International Search Report for International Patent Application No. PCT/US04/000550, dated Jul. 12, 2004, 7 pages.
Copy of Written Opinion of the International Searching Authority for International Patent Application No. PCT/US04/000550, dated Jul. 12, 2004, 5 pages.

* cited by examiner

Primary Examiner—Alison K. Pickard
(74) Attorney, Agent, or Firm—Marshall, Gerstein & Borun LLP

(57) ABSTRACT

A seal assembly is adapted for use in a valve having a trim cage with an inner surface extending along an axis and a plug sized to fit inside the trim cage inner surface, wherein the plug is adapted to move along the axis. The seal assembly includes a spring-loaded seal ring disposed between the plug and the trim cage inner surface, the seal ring including a center spring member and a jacket formed of a fluoropolymer resin to tightly seal between the plug and the trim cage inner surface. A first wiper ring is disposed between the plug and the trim cage inner surface and positioned axially upstream of the seal ring, and a second wiper ring is disposed between the plug and the trim cage inner surface and positioned axially downstream of the seal ring. Each of the first and second wiper rings has an outside surface sized to engage the trim cage inner surface and is formed of a material sufficiently rigid to scrape foreign material from the bore surface yet sufficiently soft to minimize damage to the bore.

25 Claims, 2 Drawing Sheets

VALVE PLUG SEAL ASSEMBLY

FIELD OF THE INVENTION

The present invention generally relates to seal assemblies and, more particularly, to seals used with valve plugs.

BACKGROUND OF THE INVENTION

Valves are commonly used to control the flow characteristics of a fluid. A conventional valve includes a valve body defining an inlet, an outlet, and a fluid flow path extending between the inlet and the outlet. A throttling element, such as a plug, is disposed in the path to control fluid flow. A stem connects the valve plug to an actuator, which moves the valve plug into and out of the flow path. A conventional valve may include a cage extending across the fluid flow path and having orifices formed therein. The plug has an outer surface sized to closely fit an inner wall of the cage. As a result, the plug is slidable inside the cage between a closed position, in which the plug obstructs the orifices, and an open position, in which the plug is clear of at least a portion of the orifices.

A seal is typically provided between the plug and the cage to prevent fluid from leaking therebetween. It is desirable to use a seal formed of a flexible material to ensure that a complete seal is formed between the plug and cage. It is common, for example, to provide a spring-loaded seal having a TEFLON® jacket. While the flexibility of materials such as TEFLON® improves the quality of the seal, such materials typically have a low hardness and therefore are susceptible to damage from foreign material in the vicinity of the seal. As a result, the seal is a high-wear component that requires routine replacement. While the frequency of replacement may vary greatly depending on service conditions, the seals will often last approximately 6–24 months in normal service conditions. In dirty service conditions, replacement of the seal may be more frequent. During seal replacement, the valve must be taken out of service and at least partially disassembled. As a result, such frequent seal replacement interrupts service, and is overly costly and time-consuming.

The spring-loaded seal having a TEFLON® jacket is useable in processes having a temperature of up to 450 degrees F. When the process temperature is above 450 degrees F., a risk arises that the seal may be extruded through the gap between the plug and cage. To prevent this problem, it is known to provide an anti-extrusion ring on one side of the seal. The anti-extrusion ring is typically attached to the plug and has an outer surface sized to slidably engage the inner surface of the cage, thereby preventing extrusion of the seal between the plug and cage. The anti-extrusion ring is typically formed of a high temperature thermal plastic, such as PEEK (polyetheretherketone), which retains its mechanical properties, such as flexural and tensile strength, at temperatures in excess of 450 degrees F. while being sufficiently soft to be non-damaging to the inner surface of the cage. While the use of an anti-extrusion ring allows the seal to be used in applications where the process temperature is above 450 degrees F., the use of a single ring has had no effect on the rate of wear of the seal.

In view of the foregoing, there is a need for a valve plug seal assembly having improved wear characteristics.

DETAILED DESCRIPTION

Figure 1:
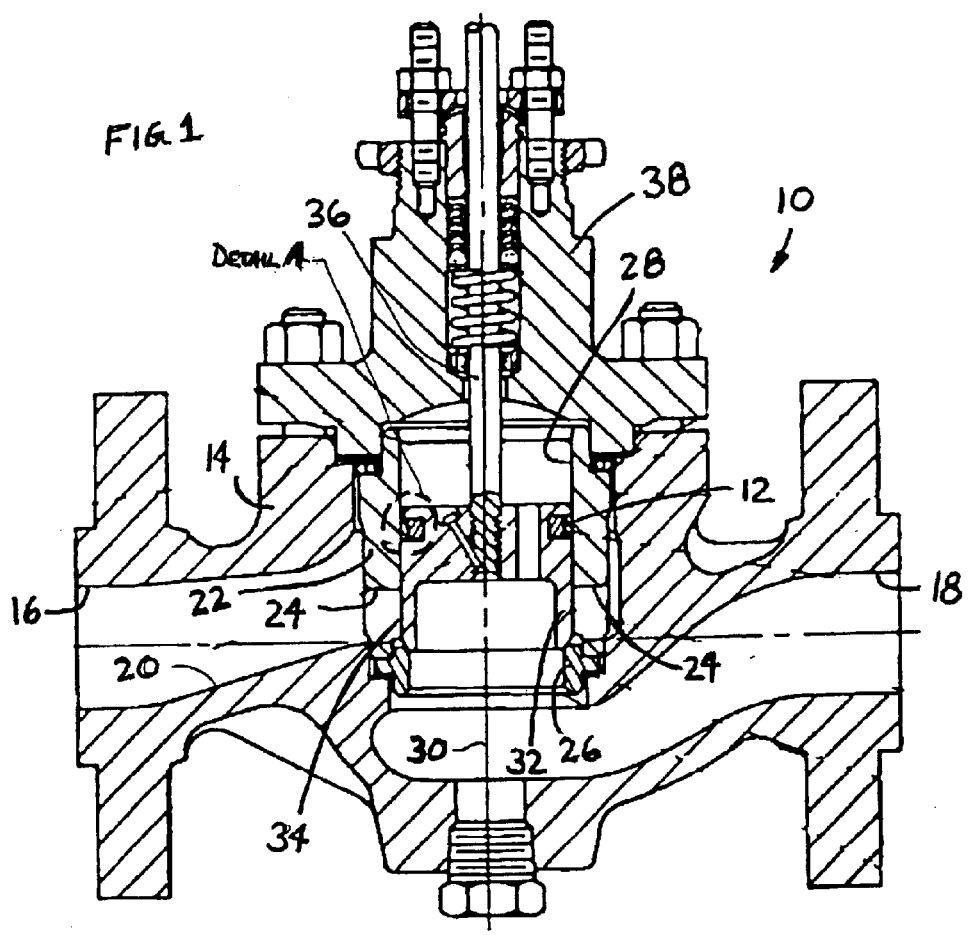
FIG. 1 is a side elevation view, in cross-section, of a valve incorporating a seal assembly in accordance with the teachings of the present invention.

FIG. 1 illustrates a valve 10 including a seal assembly 12 in accordance with the teachings of the present invention. The valve 10 includes a body 14 defining an inlet 16 and an outlet 18. The inlet 16 and outlet 18 shown in FIG. 1 assume a fluid flow from left to right through the valve 10. It will be appreciated, however, that the fluid flow may be in the reverse direction (i.e., from right to left) and therefore the inlet and outlet positions may be switched without departing from the teachings of the present invention. The valve body 14 further defines a fluid flow path 20 extending from the inlet 16 to the outlet 18.

A cage 22 is positioned in the fluid flow path 20 to influence desired characteristics of the fluid flow. The cage 22 has orifices 24 formed therein to allow fluid to flow through the cage from the inlet 16 to the outlet 18. The orifices 24 may be formed to alleviate detrimental fluid flow characteristics. For example, the orifices 24 may enhance pressure reduction or may reduce noise and cavitation generated as the fluid flows through the valve 10. According to the embodiment illustrated at FIG. 1, a seat 26 is positioned near a lower end of the cage 22. The cage 22 also defines an inner bore 28 disposed along an axis 30.

A plug 32 is provided inside the cage 22 for controlling fluid flow through the cage orifices 24. The plug 32 has an outer surface 34 sized to closely fit within the cage bore 28, so that the plug 32 is slidable within the cage 22. A stem 36 is attached to the plug 32 and extends through a bonnet 38 that closes off a top end of the valve body 14. An actuator (not shown) drives the stem up and down, thereby to move the plug 32 between open and closed positions. In the closed position illustrated in FIG. 1, a lower end of the plug 32 engages the seat 26 thereby to prevent fluid from flowing through the orifices 24. In the open position, the plug 32 is driven upward so that at least portions of the orifices 24 are unobstructed, thereby allowing fluid to flow therethrough.

Figure 2:
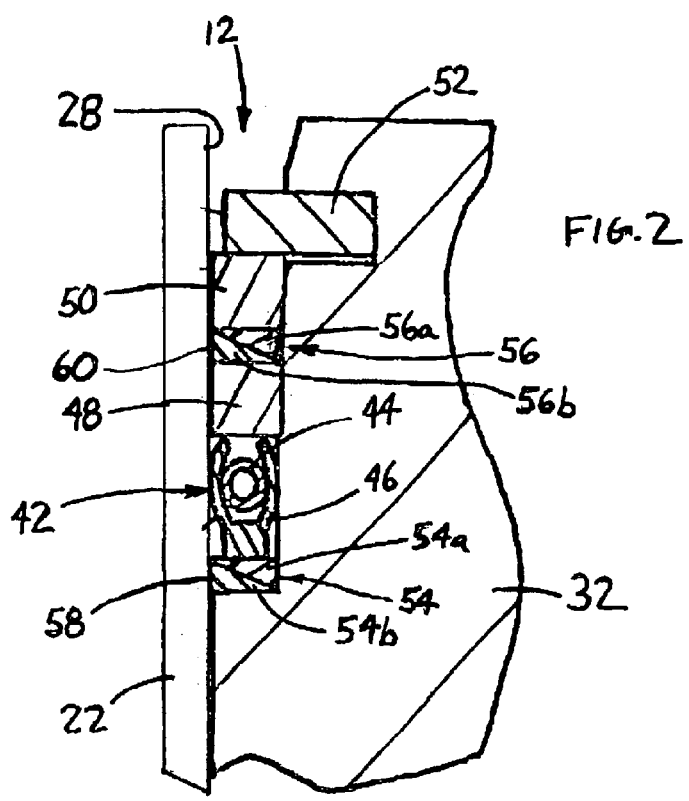
FIG. 2 is an enlarged view of detail "A" indicated in FIG. 1.

The seal assembly 12 is provided for preventing fluid from leaking between the cage 22 and plug 32. As best shown in FIG. 2, which is an enlarged view of detail A indicated in FIG. 1, the seal assembly 12 includes a spring-loaded seal 42 attached to the plug 32. The spring-loaded seal 42 has a spring 44, preferably formed of a metal material, disposed inside a jacket 46. The jacket 46 is preferably formed of a material that is flexible and does not generate excessive friction between the plug 32 and cage 22. In the preferred embodiment, the jacket 46 is formed of a fluoropolymer resin, such as the material marketed by E.I. DuPont Nemours, Inc. under the trade name TEFLON®. First and second back-up rings 48, 50 are provided for maintaining the spring-loaded seal 42 in place on the plug 32.

In accordance with the teachings of the present invention, the seal assembly 12 further includes first and second wiper rings 54, 56 located on opposite sides of the spring-loaded seal 42. The first wiper ring 54 is located axially upstream of the spring-loaded seal 42, while the second wiper ring 56 is located axially downstream of the seal 42. The first and second wiper rings 54, 56 have outside surfaces 58, 60 sized to engage the cage bore 28, and are formed of a material having a sufficient mechanical strength and rigidity to scrape away any foreign materials present on the bore 28. As a result, any such foreign material is cleared from the bore 28 as the plug moves, thereby reducing exposure of the seal 42 to such material and increasing seal life. The first and second back-up rings 48, 50 noted above also support the wiper rings 54, 56 and minimize bending stresses imparted to them due to sliding motion and deposits incurred on the inner surface of the cage 22. A retaining ring 52 is provided for holding the seal assembly 12 together.

According to the illustrated embodiment, each of the first and second wiper rings 54, 56 includes an inner ring and an outer ring. As shown in FIG. 2, the first wiper ring 54 has an inner ring 54a and an outer ring 54b. Similarly, the second wiper ring 56 includes an inner ring 56a and an outer ring 56b.

The first and second wiper rings 54, 56 may be formed of thermoplastic material that retains sufficient rigidity at temperatures above 450 degrees F. and up to at least approximately 600 degrees F., while being sufficiently resilient so as to minimize damage to the bore 28 surface. Accordingly, in the preferred embodiment, the inner and outer rings 54a, 56a, 54b, 56b of the first and second wiper rings 54, 56 are formed of polyetheretherketone (PEEK). The PEEK material may be unfilled, or may include a filler or reinforcing material such as carbon, carbon/graphite, mineral filler, glass fiber, molybdenam disulfide, or a combination thereof. As used herein, the difference between a filler material and a reinforcing material is a matter of aspect ratio, where material provided in particle form is considered a filler material and material provided in relatively longer fibers is considered a reinforcing material, as generally understood by those skilled in plastics technology. The unfilled PEEK material may be more ductile and may be easier to form in rings having thin cross-sections. The PEEK with a filler or reinforcing material, however, may have different characteristics. For example, PEEK filled or reinforced with carbon or carbon/graphite may be less ductile and more closely match the thermal coefficient of expansion of the metal cage material. A thermoplastic material is preferred because it reduces the tendency to score or mar the metal cage surface as the plug is actuated.

Figure 3:
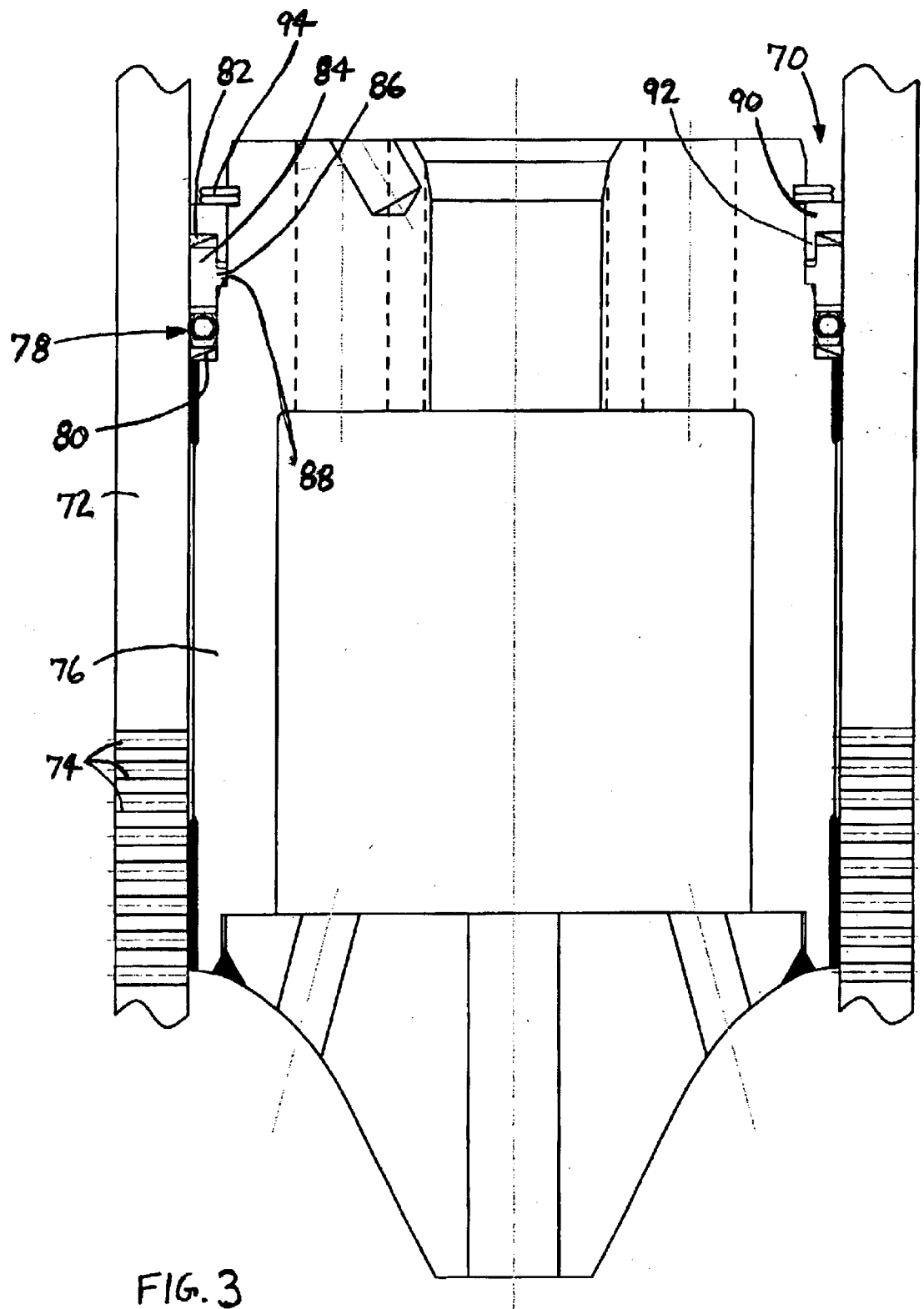
FIG. 3 is an enlarged side elevation view, in cross-section, of a preferred embodiment of the seal assembly in accordance with the teachings of the present invention.

FIG. 3 illustrates a currently preferred embodiment of a seal assembly in accordance with the teachings of the present invention. The main differences between the seal assembly 70 shown in FIG. 3 and that of the previous embodiment is the shape and size of the back-up rings. As shown in FIG. 3, a cage 72 having orifices 74 is provided. A plug 76 is slidably received inside the cage 72 for controlling fluid flow through the orifices 74. The seal assembly 70 includes a spring-loaded seal 78 and first and second wiper rings 80, 82 positioned on opposite sides of the seal 78. A first back-up ring 84 is positioned directly above the seal 78 and has an inner flange 86 engaging a shoulder 88 formed in the plug. The shoulder 88 minimizes the compressive loads on the seal 78 during movement of the plug 76. For example, when the plug 78 moves in an upward direction, the shoulder 88 limits downward movement of the back-up ring 84 should the back-up ring encounter a deposit in the cage 72. A deposit would normally force the back-up ring 84 toward the seal 78, thereby creating the risk of overly compressing the seal 78. The shoulder 88, however, limits movement of the back-up ring 84 in the direction of the seal 78, thereby minimizing the risk of seal compression. A second back-up ring 90 is positioned above the second wiper ring 82 and includes an inner annual wall extension 92 sized to fit inside a channel defined between the first back-up ring 84 and the plug 76. The channel allows the second back-up ring 90 to slide toward the first back-up ring 84, thereby compressing the second wiper ring 82 therebetween. A retaining ring 94 is provided for holding the seal assembly 70 in place.

The foregoing detailed description has been given for clearness of understanding only, and no unnecessary limitations should be understood therefrom, as modifications would be obvious to those skilled in the art.

What is claimed is:

1. A valve comprising:
   a body defining a bore extending along an axis;
   a plug sized to fit inside the bore and adapted for slidable movement along the bore axis;
   a seal ring disposed between the plug and the bore, the seal ring being formed of a flexible material to tightly seal between the plug and the bore;
   a first wiper ring disposed between the plug and bore and positioned axially upstream of the seal ring;
   a second wiper ring disposed between the plug and the bore and positioned axially downstream of the seal ring;
   a first back-up ring positioned between the second wiper ring and the seal ring and, a second back-up positioned axaially downstream of the second wiper ring;
   wherein each of the first and second wiper rings have an outside surface sized to engage the bore and are formed of a wiper ring material sufficiently rigid to scrape foreign material from a surface of the bore as the plug moves yet sufficiently resilient to minimize damage to the bore surface.

2. The valve of claim 1, in which the wiper ring material comprises a high temperature thermoplastic.

3. The valve of claim 2, in which the wiper ring material substantially maintains rigidity and resilience in process temperatures of at least 450 degrees F.

4. The valve of claim 3, in which the wiper ring material comprises PEEK.

5. The valve of claim 4, in which the PEEK includes a filler material.

6. The valve of claim 5, in which the filler material comprises a material selected from a group of materials consisting of carbon, carbon/graphite, mineral filler, glass fiber, and molybdenam disulfide.

7. The valve of claim 4, in which the PEEK includes a reinforcing material.

8. The valve of claim 7, in which the reinforcing material comprises a material selected from a group of materials consisting of carbon, carbon/graphite, mineral filler, glass fiber, and molybdenam disulfide.

9. The valve of claim 1 in which the seal ring comprises an inner spring and a jacket formed of a fluoropolymer resin.

10. A seal assembly for use in a valve having a trim cage with an inner surface extending along an axis and a plug sized to fit inside the trim cage inner surface, the plug adapted to move along the axis, the seal assembly comprising:
   a seal ring disposed between the plug and the trim cage inner surface, the seal ring being formed of a flexible material adapted to tightly seal between the plug and the trim cage inner surface;
   a first wiper ring disposed between the plug and the trim cage inner surface positioned axially upstream of the seal ring;
   a second wiper ring disposed between the plug and the trim cage inner surface positioned axially downstream of the seal ring;

a first back-up ring positioned between the second wiper ring and the seal ring; and, a second back-up ring positioned axially downstream of the second wiper ring;

wherein each of the first and second wiper rings has an outside surface sized to engage the trim cage inner surface and is formed of a wiper ring material sufficiently rigid to remove foreign material from the trim cage inner surface as the plug moves yet sufficiently resilient to minimize damage to the bore surface.

11. The seal assembly of claim 10, in which the wiper ring material comprises a high temperature thermoplastic.

12. The seal assembly of claim 11, in which the wiper ring material substantially maintains rigidity and resilience in process temperatures of at least 450 degrees F.

13. The seal assembly of claim 12, in which the wiper ring material comprises PEEK.

14. The seal assembly of claim 13, in which the PEEK includes a filler material.

15. The seal assembly of claim 14, in which the filler material comprises a material selected from a group of materials consisting of carbon, carbon/graphite, mineral filler, glass fiber, and molybdenam disulfide.

16. The seal assembly of claim 13, in which the PEEK includes a reinforcing material.

17. The seal assembly of claim 16, in which the reinforcing material comprises a material selected from a group of materials consisting of carbon, carbon/graphite, mineral filler, glass fiber, and molybdenam disulfide.

18. The seal assembly of claim 10 in which the seal ring comprises an inner spring and a jacket formed of a fluoropolymer resin.

19. A valve comprising:

a body defining a bore extending along an axis;

a plug sized to fit inside the bore and adapted for slidable movement along the bore axis, the plug including a shoulder;

a seal ring disposed between the plug and the bore, the seal ring being formed of a flexible material to tightly seal between the plug and the bore;

a first wiper ring disposed between the plug and bore and positioned axially upstream of the seal ring;

a second wiper ring disposed between the plug and the bore and positioned axially downstream of the seal ring; and a back-up ring positioned between the second wiper ring and the seal ring, the back-up ring including an inner flange sized to engage the plug shoulder, the inner flange limiting movement of the back-up ring toward the seal thereby to minimize a compressive load on the seal as the plug moves axially upstream;

wherein each of the first and second wiper rings have an outside surface sized to engage the bore and are formed of a wiper ring material sufficiently rigid to scrape foreign material from a surface of the bore as the plug moves yet sufficiently resilient to minimize damage to the bore surface.

20. The valve of claim 19, in which the wiper ring material comprises a high temperature thermoplastic.

21. The valve of claim 20, in which the wiper ring material substantially maintains rigidity and resilience in process temperatures of at least 450 degrees F.

22. The valve of claim 21, in which the wiper ring material comprises PEEK.

23. The valve of claim 22, in which the PEEK includes a filler material.

24. The valve of claim 22, in which the PEEK includes a reinforcing material.

25. The valve of claim 19, in which the seal ring comprises in inner spring and a jacket formed of a fluoropolymer resin.

* * * * *

UNITED STATES PATENT AND TRADEMARK OFFICE
CERTIFICATE OF CORRECTION

PATENT NO.    : 6,840,520 B2
DATED         : January 11, 2005
INVENTOR(S)   : Wayne R. Faas et al.

It is certified that error appears in the above-identified patent and that said Letters Patent is hereby corrected as shown below:

Column 4,
Line 24, please delete "the seal ring and, a second back-up positioned axaially", and insert -- the seal ring; and, a second back-up ring positioned axially --.

Column 6,
Line 35, please delete "in inner spring" and insert -- an inner spring --.

Signed and Sealed this

Twenty-fourth Day of May, 2005

JON W. DUDAS
*Director of the United States Patent and Trademark Office*